US012098720B2

(12) United States Patent
Liu et al.

(10) Patent No.: US 12,098,720 B2
(45) Date of Patent: Sep. 24, 2024

(54) COMPRESSOR WITH TWO ROTORS COAXIALLY DISPOSED ON A CONNECTING ASSEMBLY SLEEVED ON THE SHAFT THAT LIMITS RELATIVE MOVEMENT BETWEEN THEM

(71) Applicant: Gree Electric Appliances, Inc. of Zhuhai, Guangdong (CN)

(72) Inventors: Hua Liu, Guangdong (CN); Zhiping Zhang, Guangdong (CN); Zhongkeng Long, Guangdong (CN); Cong Cao, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 18/267,875

(22) PCT Filed: Oct. 25, 2021

(86) PCT No.: PCT/CN2021/126093
§ 371 (c)(1),
(2) Date: Jun. 16, 2023

(87) PCT Pub. No.: WO2022/179144
PCT Pub. Date: Sep. 1, 2022

(65) Prior Publication Data

US 2024/0035471 A1 Feb. 1, 2024

(30) Foreign Application Priority Data

Feb. 26, 2021 (CN) ............................ 202110219948

(51) Int. Cl.

| | |
|---|---|
| ***F04C 18/16*** | (2006.01) |
| ***F04C 29/00*** | (2006.01) |
| ***F04C 29/02*** | (2006.01) |

(52) U.S. Cl.
CPC ............ *F04C 18/16* (2013.01); *F04C 18/165* (2013.01); *F04C 29/00* (2013.01);
(Continued)

(58) Field of Classification Search
CPC ........ F04C 18/16; F04C 18/165; F04C 29/00; F04C 29/0021; F04C 29/0042;
(Continued)

(56) References Cited

U.S. PATENT DOCUMENTS 1,430,894 A * 10/1922 Fay .......................... F04C 2/16
418/200
6,341,951 B1 1/2002 Chen et al.
(Continued)

FOREIGN PATENT DOCUMENTS

CN 101793251 A 8/2010
CN 107394914 A 11/2017
(Continued)

OTHER PUBLICATIONS

Machine Translation of Foreign Patent Publication CN 107394914A; Inventor: Zhu; Title: Rotor Assembly of Motor and Motor with the Same; Published: Nov. 24, 2017 (Year: 2017).*
(Continued)

*Primary Examiner* — Mary A Davis
(74) *Attorney, Agent, or Firm* — The Webb Law Firm

(57) ABSTRACT

The present disclosure provides a compressor and an air conditioner. The compressor includes a housing; a first rotating shaft mounted in the housing; a connecting assembly sleeved on the first rotating shaft; and a first rotor assembly including a first rotor and a second rotor coaxially disposed on the connecting assembly. The connecting assembly carries the first rotor and the second rotor to rotate about the first rotating shaft together. The connecting assembly is configured to limit the relative positions of the first
(Continued)

rotor and the second rotor, such that there exists a clearance between the first rotor and the second rotor. The present disclosure can maintain a clearance between the first rotor and the second rotor without increasing the number of components of the compressor.

22 Claims, 5 Drawing Sheets

(52) U.S. Cl.
CPC ...... *F04C 29/0021* (2013.01); *F04C 29/0042* (2013.01); *F04C 29/023* (2013.01); *F04C 2230/602* (2013.01); *F04C 2240/20* (2013.01); *F04C 2240/50* (2013.01); *F04C 2240/56* (2013.01); *F04C 2240/60* (2013.01); *F04C 2240/605* (2013.01); *F04C 2250/101* (2013.01); *F04C 2250/102* (2013.01); *F05C 2201/0478* (2013.01); *F05C 2201/0493* (2013.01)

(58) Field of Classification Search
CPC .............. F04C 29/023; F04C 2230/602; F04C 2240/20; F04C 2240/50; F04C 2240/60; F04C 2250/101; F04C 2250/102; F05C 2201/0478; F05C 2201/0493
See application file for complete search history.

(56) References Cited

U.S. PATENT DOCUMENTS

| | | | | |
|---|---|---|---|---|
| 9,086,067 | B2 * | 7/2015 | Masuda | F04C 29/122 |
| 2019/0128260 | A1 * | 5/2019 | Akei | F04C 18/16 |

FOREIGN PATENT DOCUMENTS

| | | | |
|---|---|---|---|
| CN | 206785730 | U | 12/2017 |
| CN | 109751240 | A | 5/2019 |
| CN | 111043033 | A | 4/2020 |
| CN | 111247343 | A | 6/2020 |
| CN | 112780554 | A | 5/2021 |
| CN | 112780556 | A | 5/2021 |
| CN | 112796999 | A | 5/2021 |
| CN | 215256792 | U | 12/2021 |
| JP | 2015183572 | A | 10/2015 |

OTHER PUBLICATIONS

International Search Report, PCT/CN2021/126093, Sep. 1, 2022.

* cited by examiner

COMPRESSOR WITH TWO ROTORS COAXIALLY DISPOSED ON A CONNECTING ASSEMBLY SLEEVED ON THE SHAFT THAT LIMITS RELATIVE MOVEMENT BETWEEN THEM

CROSS-REFERENCE TO RELATED APPLICATIONS

This application is the United States national phase of International Application No. PCT/CN2021/126093, filed Oct. 25, 2021, and claims priority to Chinese Patent Application No. 202110219948.6, filed Feb. 26, 2021, the disclosures of which are hereby incorporated by reference in their entireties.

BACKGROUND OF THE INVENTION

Field of the Invention

The present disclosure relates to the field of compressor technology, in particular to a compressor and an air conditioner.

Description of Related Art

Usually a pair of parallel helical rotors is arranged in a compressor, and this pair of helical rotors forms a space volume with the inner wall of a housing. This volume will increase and decrease periodically in the working process of the helical rotors. Through a reasonable design, this volume is periodically communicated with and closed to suction and exhaust ports, so that the whole process of suction, compression and exhaust can be completed. At present, dual compressors are widely applied to refrigeration air conditioners in a medium cooling capacity range.

In the working process of the helical rotors, different pressures of the gas at the suction and exhaust ports cause the helical rotors to generate axial forces, which cause the helical rotors to move in the housing along the axial direction of the helical rotors, so as to cause adjacent end surfaces of the two helical rotors disposed oppositely to collide with each other. In the related technology, an additional thrust bearing is usually provided between the two helical rotors to prevent the adjacent end surfaces of the two helical rotors from colliding with each other, but the additional thrust bearing increases the number of components of the compressor, resulting in an increased size of the compressor.

SUMMARY OF THE INVENTION

The present disclosure provides a compressor and an air conditioner that can maintain a clearance between a first rotor and a second rotor without increasing the number of components of the compressor.

The present disclosure provides a compressor, comprising:

- a housing;
- a first rotating shaft mounted in the housing;
- a connecting assembly sleeved on the first rotating shaft; and
- a first rotor assembly comprising a first rotor and a second rotor coaxially disposed on the connecting assembly, the connecting assembly carrying the first rotor and the second rotor to rotate about the first rotating shaft together;
- wherein the connecting assembly is configured to limit the relative positions of the first rotor and the second rotor, such that there exists a clearance between the first rotor and the second rotor.

In an optional embodiment of the present disclosure, there exists a first axial clearance between the end surface of the first rotor away from the second rotor and the end surface of the housing close to the first rotor, there exists a second axial clearance between the end surface of the second rotor away from the first rotor and the end surface of the housing close to the second rotor, and the connecting assembly is configured to limit that the clearance between the first rotor and the second rotor is greater than the first axial clearance and the clearance between the first rotor and the second rotor is greater than the second axial clearance.

In an optional embodiment of the present disclosure, the compressor further comprises:

- a second rotating shaft mounted in the housing; and
- a second rotor assembly comprising a third rotor and a fourth rotor coaxially disposed on the second rotating shaft, the second rotating shaft being configured to drive the second rotor assembly to rotate along a direction opposite to the rotating direction of the first rotor assembly, the third rotor and the first rotor being engaged with each other, and the fourth rotor and the second rotor being engaged with each other.

In an optional embodiment of the present disclosure, the end surface of the third rotor close to the fourth rotor protrudes out of the end surface of the first rotor close to the second rotor, and the end surface of the fourth rotor close to the third rotor protrudes out of the end surface of the second rotor close to the first rotor, such that the first rotor does not interfere with the fourth rotor and the second rotor does not interfere with the third rotor.

In an optional embodiment of the present disclosure, adjacent end surfaces of the third rotor and the fourth rotor are joined.

In an optional embodiment of the present disclosure, the end surface of the third rotor close to the fourth rotor has a distance d1 from the end surface of the first rotor close to the second rotor in the axial direction of the second rotating shaft, the end surface of the fourth rotor close to the third rotor has a distance d2 from the end surface of the second rotor close to the first rotor in the axial direction of the second rotating shaft, and the second rotor assembly is configured to satisfy: $d2=d1$.

In an optional embodiment of the present disclosure, the clearance between the first rotor and the second rotor is L3, the amount of axial movement that the third rotor moves in the housing along the axial direction of the second rotating shaft toward a direction close to the fourth rotor is D1, the amount of axial movement that the second rotor moves toward a direction close to the first rotor is D2, the amount of axial movement that the fourth rotor moves in the housing along the axial direction of the second rotating shaft toward a direction close to the third rotor is D3, the amount of axial movement that the first rotor moves toward a direction close to the second rotor is D4, and the second rotor assembly is configured to satisfy: $L3 \geq D1+D2$, and $L3 \geq D3+D4$.

In an optional embodiment of the present disclosure, a suction port is formed at an adjacent position of the first rotor, the second rotor, the third rotor and the fourth rotor, a first exhaust port is formed at an adjacent position of the first rotor, the third rotor and the housing, and a second exhaust port is formed at an adjacent position of the second rotor, the fourth rotor and the housing.

In an optional embodiment of the present disclosure, the first rotor has a helical direction opposite to that of the second rotor, and the third rotor has a helical direction opposite to that of the fourth rotor.

In an optional embodiment of the present disclosure, the third rotor is integrally formed with the second rotating shaft, and the fourth rotor has a shaft hole that fits the second rotating shaft, and the rotating shaft is in tight fit with the second rotating shaft.

In an optional embodiment of the present disclosure, the compressor further comprises a thrust bearing disposed on one side of the second rotating shaft and a motor disposed on the other side of the second rotating shaft, and the motor is configured to drive the second rotating shaft to rotate, so that the second rotor assembly follows the rotation of the second rotating shaft and drives the first rotor assembly and the connecting assembly to rotate around the first rotating shaft together.

In an optional embodiment of the present disclosure, the end surface of the third rotor away from the fourth rotor is flush with the end surface of the first rotor away from the second rotor in a direction perpendicular to the axial direction of the second rotating shaft; and the end surface of the fourth rotor away from the third rotor is flush with the end surface of the second rotor away from the first rotor in a direction perpendicular to the axial direction of the second rotating shaft.

In an optional embodiment of the present disclosure, wherein the connecting assembly comprises a first limiting member and a second limiting member both sleeved on the first rotating shaft and both rotatable about the first rotating shaft, the first limiting member is configured to limit the position of the end surface of the first rotor close to the second rotor, and the second limiting member is configured to limit the position of the end surface of the second rotor close to the first rotor.

In an optional embodiment of the present disclosure, the end surface of the first rotor close to the second rotor is provided with a first limiting groove along the axial direction of the first rotating shaft, the first limiting member comprises a first main body portion and a first limiting portion, the first main body portion is sleeved on the first rotor, the first limiting portion is disposed around the periphery of the outer surface of the first main body portion and the first limiting portion is stuck in the first limiting slot; and the end surface of the second rotor close to the first rotor is provided with a second limiting groove along the axial direction of the first rotating shaft, the second limiting member comprises a second main body portion and a second limiting portion, the second main body portion is sleeved on the first rotating shaft and disposed adjacent to the first main body portion, the second limiting portion is disposed around the periphery of the outer surface of the second main body portion and the second limiting portion is stuck in the second limiting slot.

In an optional embodiment of the present disclosure, the end surface of the first limiting portion close to the second limiting portion protrudes on the side of the end surface of the first rotor close to the second rotor, and the end surface of the second limiting portion close to the first limiting portion protrudes on the side of the end surface of the second rotor close to the first rotor.

In an optional embodiment of the present disclosure, the distance between the end surface of the first rotor close to the second rotor and the end surface of the second rotor close to the first rotor in the axial direction of the first rotating shaft increases gradually from the axis of the first rotor assembly to the outer periphery of the first rotor assembly.

In an optional embodiment of the present disclosure, the first limiting member comprises a first main body portion and a first limiting portion, the first main body portion is sleeved on the first rotating shaft, the first limiting portion is disposed around the periphery of the outer surface of the first main body portion, and the side of the first limiting portion away from the second rotor abuts against the end surface of the first rotor close to the second rotor, and the second limiting member comprises a second main body portion and a second limiting portion, the second main body portion is sleeved on the first rotating shaft and disposed adjacent to the first main body portion, the second limiting portion is disposed around the periphery of the outer surface of the second main body portion, and the side of the second limiting portion away from the first rotor abuts against the end surface of the second rotor close to the first rotor.

In an optional embodiment of the present disclosure, the connecting assembly further comprises a third limiting member and a fourth limiting member, the third limiting member is configured to limit the distance between the end surface of the first rotor away from the second rotor and the housing, and the fourth limiting member is configured to limit the distance between the end surface of the second rotor away from the first rotor and the housing.

In an optional embodiment of the present disclosure, the third limiting member comprises a third main body portion and a third limiting portion, the third main body portion is sleeved on the first rotating shaft and disposed adjacent to the first main body portion, the third limiting portion is disposed around the periphery of the outer surface of the third main body portion, and the third limiting portion abuts against the end surface of the first rotor away from the second rotor; and the fourth limiting member comprises a fourth main body portion and a fourth limiting portion, the fourth main body portion is sleeved on the first rotating shaft and disposed adjacent to the second main body portion, the fourth limiting portion is disposed around the periphery of the outer surface of the fourth main body portion, and the fourth limiting portion abuts against the end surface of the second rotor away from the first rotor.

In an optional embodiment of the present disclosure, the end surface of the first rotor away from the second rotor is provided with a third limiting groove along the axial direction of the first rotating shaft, the third limiting member comprises a third main body portion and a third limiting portion, the third main body portion is sleeved on the first rotating shaft and disposed adjacent to the first main body portion, the third limiting portion is disposed around the periphery of the outer surface of the third main body portion and the third limiting portion is stuck in the third limiting slot; and the end surface of the second rotor away from the first rotor is provided with a fourth limiting groove along the axial direction of the first rotating shaft, the fourth limiting member comprises a fourth main body portion and a fourth limiting portion, the fourth main body portion is sleeved on the first rotating shaft and disposed adjacent to the second main body portion, the fourth limiting portion is disposed around the periphery of the outer surface of the fourth main body portion and the fourth limiting portion is stuck in the fourth limiting slot.

In an optional embodiment of the present disclosure, the material of the connecting assembly comprises a tin bronze material.

In an optional embodiment of the present disclosure, the first rotating shaft and the connecting assembly are each provided with an oil supply passage, and the oil supply passages located on the first rotating shaft are in communication with the oil supply passage located on the connecting assembly.

Embodiments of the present disclosure also provide an air conditioner comprising the compressor as described above.

In embodiments of the present disclosure, by improvement of the connecting assembly connecting the first rotating shaft and the first rotor assembly, the connecting assembly can limit the relative positions between the first rotor and the second rotor and can achieve that a clearance is maintained between the first rotor and the second rotor without addition of additional components, thereby ensuring that adjacent end surfaces of the first rotor and the second rotor do not collide with each other.

BRIEF DESCRIPTION OF THE DRAWINGS

In order to illustrate technical solutions in embodiments of the present disclosure more clearly, the accompanying drawings required for use in description of the embodiments will be briefly introduced below. Obviously, the accompanying drawings in the following description are merely some of the embodiments of the present disclosure. For a person skilled in the art, other drawings can also be obtained according to these drawings without creative efforts.

Reference signs respectively represent:

200, compressor,

10, housing; 11, suction port; 12, first exhaust port; 13, second exhaust port; 14, enclosure; 15, first bearing house; 16, second bearing house;

20, first rotating shaft; 21, second oil supply passage; 211, main oil supply passage; 212, auxiliary oil supply passage;

30, connecting assembly; 31, first limiting member, 311, first main body portion; 312, first limiting portion; 3121, first side; 3122, second side; 313, first shaft hole; 32, second limiting member; 321, second main body portion; 322, second limiting portion; 3221, third side; 3222, fourth side; 323, second shaft hole; 33, third limiting member. 331, third main body portion; 332, third limiting portion; 3321, fifth side; 3322, sixth side; 34, fourth limiting member. 341, fourth main body portion; 3421, seventh side; 3422, eighth side; 342, fourth limiting portion; 35, first oil supply passage;

40, first rotor assembly; 41, first rotor; 411, first end surface; 412, second end surface; 413, first limiting slot; 414, first body; 415, first helical blade; 416, third limiting slot; 42, second rotor; 421, third end surface; 422, fourth end surface; 423, second limiting slot; 424, second body portion; 425, second helical blade; 426, fourth limiting slot;

50, second rotating shaft; 51, first end; 52, second end;

60, second rotor assembly; 61, third rotor; 611, fifth end surface; 612, sixth end surface; 613, third helical blade; 62, fourth rotor; 621, seventh end surface; 622, eighth end surface; 623, fourth helical blade;

70, thrust bearing:

80, drive motor,

91, first radial bearing; 92, second radial bearing.

DESCRIPTION OF THE INVENTION

Technical solutions in the embodiments of the present disclosure will be described below clearly and completely in conjunction with the accompanying drawings in the embodiments of the present disclosure. Obviously, the described embodiments are only part of, instead of all of embodiments of the present disclosure. Based on the embodiments of the present disclosure, all of other embodiments obtained by a person skilled in the art without creative work should fall into the protection scope of the present disclosure.

References herein to “embodiment” or “implementation” mean that a particular feature, structure or characteristic described in conjunction with an embodiment or implementation may be included in at least one of the embodiments of the present disclosure. The presence of this phrase at various locations in the specification does not necessarily refer to the same embodiment, nor is it an independent or alternative embodiment that is mutually exclusive with other embodiments. It is understood, both explicitly and implicitly, by a person skilled in the art that the embodiments described herein may be combined with other embodiments.

Figure 1:
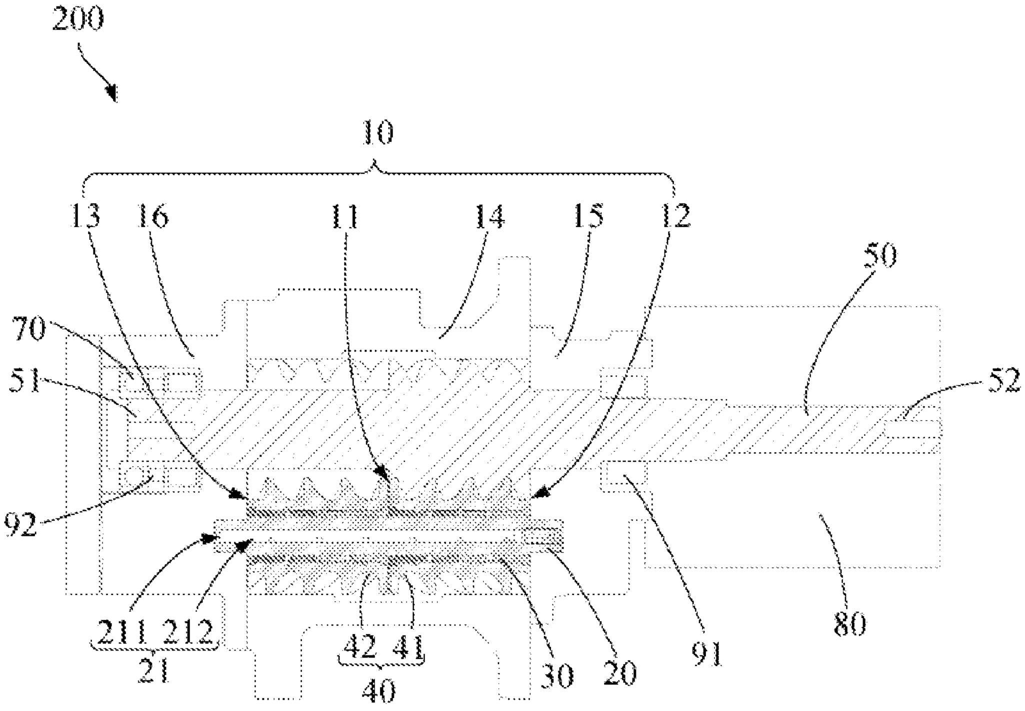
FIG. 1 is a sectional diagram of a compressor provided by an embodiment of the application.

The present disclosure provides a compressor. Please refer to FIG. 1, FIG. 1 is a first partial sectional view of a compressor provided by an embodiment of the application. The compressor 200 shown in FIG. 1 may be a screw compressor, for example, the compressor 200 is an opposed screw compressor. It should be noted that the compressor 200 shown in FIG. 1 is not limited to a screw compressor, for example, the compressor 200 may also be a scroll compressor. The compressor 200 may include a housing 10, a first rotating shaft 20, a connecting assembly 30, and a first rotor assembly 40. The housing 10 may be used to accommodate a part of the first rotating shaft 20, the connecting assembly 30, and the first rotor assembly 40. It will be appreciated that the first rotating shaft 20 may be mounted in the housing 10, for example, the first rotating shaft 20 may be threaded into the housing 10 and both ends of the first rotating shaft 20 are exposed outside of the housing 10.

It should be noted that the terms “first”, “second” and the like in the specification and claims and the accompanying drawings above of the present disclosure are used to distinguish different objects, and are not used to describe a specific sequence. In addition, the terms “comprise” and “have” and any variations thereof are intended to cover non-exclusive inclusion.

As shown in FIG. 1, the connecting assembly 30 may be sleeved on the first rotating shaft 20. The first rotor assembly

40 may include a first rotor 41 and a second rotor 42, and the first rotor 41 and the second rotor 42 are coaxially disposed on the connecting assembly 30. The connecting assembly 30 is configured to carry the first rotor 40 and the second rotor 42 to rotate around the first rotating shaft 20 together and to limit the relative positions between the first rotor 41 and the second rotor 42, so that there exists a clearance between the first rotor 41 and the second rotor 42. Wherein the connecting assembly may be a sliding bearing or a rolling bearing.

Figure 3:
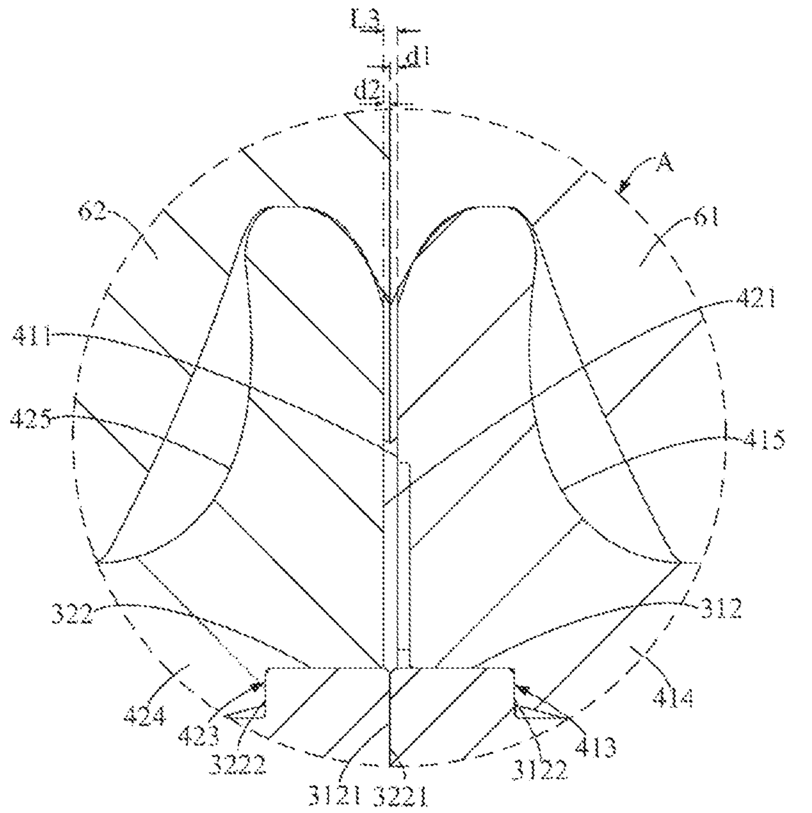
FIG. 3 is an enlarged structure diagram of part A in the first rotating shaft, the first rotor assembly and the connecting assembly shown in FIG. 2.
Figure 4:
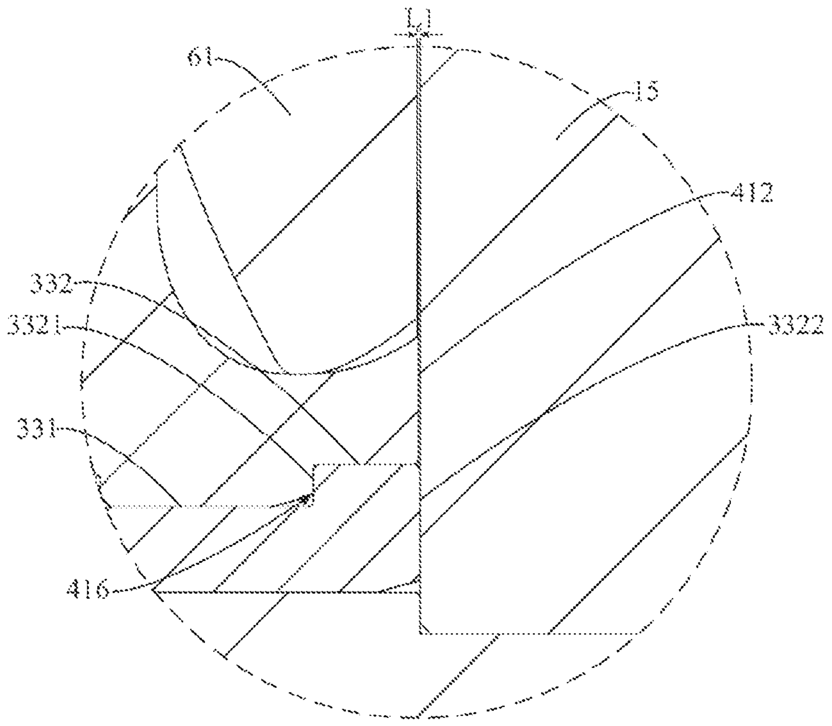
FIG. 4 is an enlarged structure diagram of part B in the first rotating shaft, the first rotor assembly and the connecting assembly shown in FIG. 2.
Figure 5:
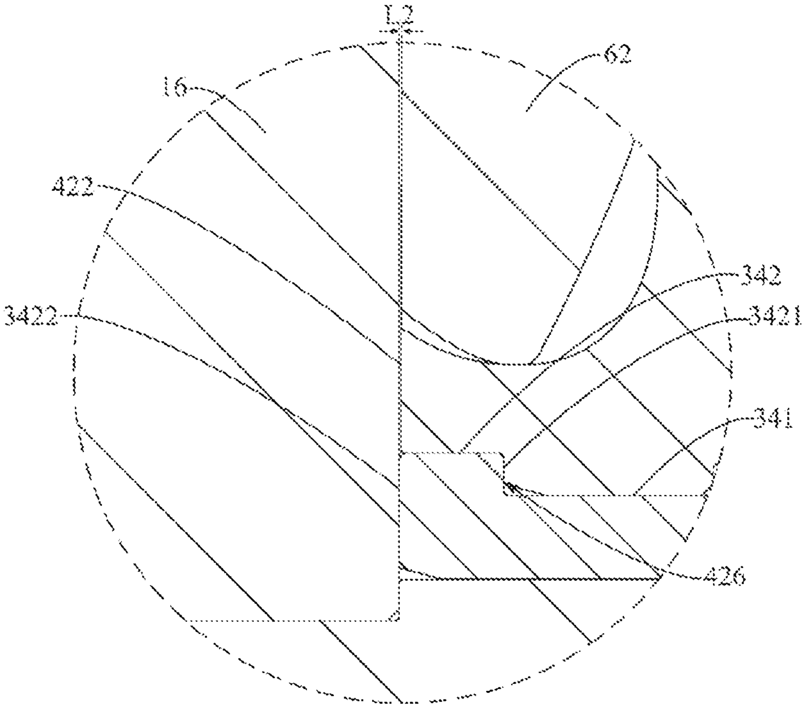
FIG. 5 is an enlarged structure diagram of part C in the first rotating shaft, the first rotor assembly and the connecting assembly shown in FIG. 2.

In the related art, an additional spacer disposed between the two rotors of the first rotor assembly 40 is typically used to separate the two rotors and maintain the clearance between the two rotors during rotation, but the spacer requires additional addition, thereby increasing the number of components of the compressor 200. However, an embodiment of the present disclosure directly improves the connecting assembly 30 connecting the first rotating shaft 20 and the first rotor assembly 40, so that the connecting assembly 30 can limit the relative positions between the first rotor 41 and the second rotor 42 and achieve maintaining a clearance between the first rotor 41 and the second rotor 42 without additional components, thus ensuring that the adjacent end surfaces of the first rotor 41 and the second rotor 42 do not collide with each other. As shown in FIGS. 2 to 5, FIG. 2 is a structure diagram of the first rotating shaft, the first rotor assembly and the connecting assembly in the compressor shown in FIG. 1; FIG. 3 is an enlarged structure diagram of part A in the first rotating shaft, the first rotor assembly and the connecting assembly shown in FIG. 2; FIG. 4 is an enlarged structure diagram of part B of the first rotating shaft, the first rotor assembly and the connecting assembly shown in FIG. 2; and FIG. 5 is an enlarged structure diagram of part C of the first rotating shaft, the first rotor assembly and the connecting assembly shown in FIG. 2. The first rotor 41 may include a first end surface 411 and a second end surface 412 disposed back to back, the first end surface 411 is the end surface of the first rotor 41 close to the second rotor 42, and the second end surface 412 is the end surface of the first rotor 41 away from the second rotor 42. The second rotor 42 may include a third end surface 421 and a fourth end surface 422 disposed back to back, the third end surface 421 is the end surface of the second rotor 42 close to the second rotor 41, and the fourth end surface 421 is the end surface of the first rotor 41 away from the second rotor 42.

The first end surface 411 is disposed adjacent to and spaced apart from the third end surface 421, the second end surface 412 is disposed adjacent to and spaced apart from one side of the housing 10, and the fourth end surface 422 is disposed opposite to and spaced apart from the other side of the housing 10. There exists a first axial clearance L1 between the second end surface 412 of the first rotor 41 and the end surface of the housing 10 close to the first rotor 41. There exists a second axial clearance L2 between the fourth end surface 4 of the second rotor 42 and the end surface of the housing 10 close to the second rotor 42. The connecting assembly 30 is configured to limit the relative positions of the first rotor 41 and the second rotor 42 such that there exists a third axial clearance L3 between the first end surface 411 of the first rotor 41 and the third end surface 421 of the second rotor 42.

It will be appreciated that in an embodiment of the present disclosure, when the first rotor 41 moves along the axial direction of the first rotating shaft 20 toward a direction close to the end surface of the housing 10 adjacent to the first rotor 41, the third axial clearance L3 is greater than the first axial clearance L1, so that even when the second end surface 411 of the first rotor 41 abuts against the end surface of the housing 10 adjacent to the first rotor 41, the first end surface 411 of the first rotor 41 and the third end surface 421 of the second rotor 42 will not abut against each other, i.e., a clearance is still present between the first rotor 41 and the second rotor 42.

When the second rotor 42 moves along the axial direction of the first rotating shaft 20 toward a direction close to the end surface of the housing 10 adjacent to the second rotor 42, the third axial clearance L3 is greater than the second axial clearance L2, so that even when the fourth end surface 421 of the second rotor 42 abuts against the end surface of the housing 10 adjacent to the second rotor 42, the first end surface 411 of the second rotor 41 and the third end surface 421 of the second rotor 42 will not abut against each other, i.e., a clearance is still present between the first rotor 41 and the second rotor 42.

Figure 2:
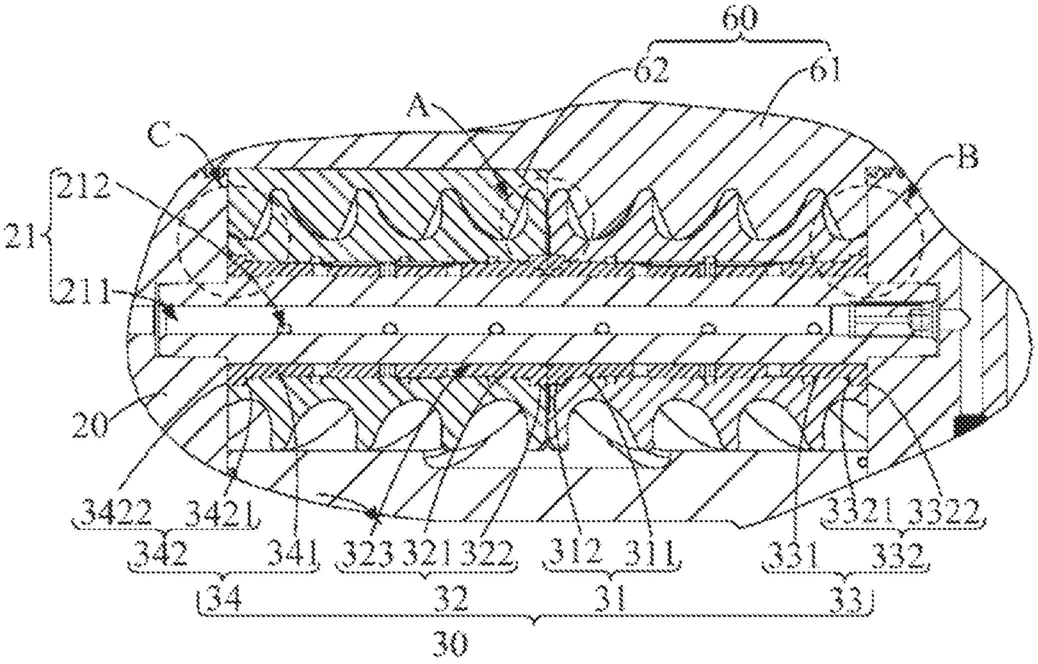
FIG. 2 is a partial structure diagram of the first rotating shaft, the first rotor assembly and the connecting assembly in the compressor shown in FIG. 1.

Exemplarily, please further refer to FIGS. 2 and 4, the connecting assembly 30 may include a first limiting member 31 and a second limiting member 32, and the first limiting member 31 and the second limiting member 32 are both sleeved on the first rotating shaft 20 and rotatable about the first rotating shaft 20. The first rotor 41 is sleeved on the first limiting member 31 and fixedly connected with the first limiting member 31 such that the first rotor 41 may follow the first limiting member 31 to rotate around the first rotating shat 20 together, wherein the first limiting member 31 is configured to limit the movement distance that the end surface of the first rotor 41 close to the second rotor 42 moves toward the second rotor 42. The second rotor 42 is disposed on the second limiting member 32 and fixedly connected with the second limiting member 32 such that the second rotor 42 can follow the second limiting member 32 to rotate around the first rotating shaft 20 together, wherein the second limiting member 32 is configured to limit the movement distance that the end surface of the second rotor 42 close to the first rotor 41 moves toward a direction close to the first rotor 41.

It will be appreciated that the first limiting member 31 is configured to limit the position of the first end surface 411 of the first rotor 41, the second limiting member 32 is configured to limit the position of the second end surface 411 of the second rotor 42, the first limiting member 31 and the second limiting member 32 cooperate together such that there exists the third axial clearance L3 between the first end surface 411 of the first rotor 41 and the third end surface 421 of the second rotor 42.

Figure 6:
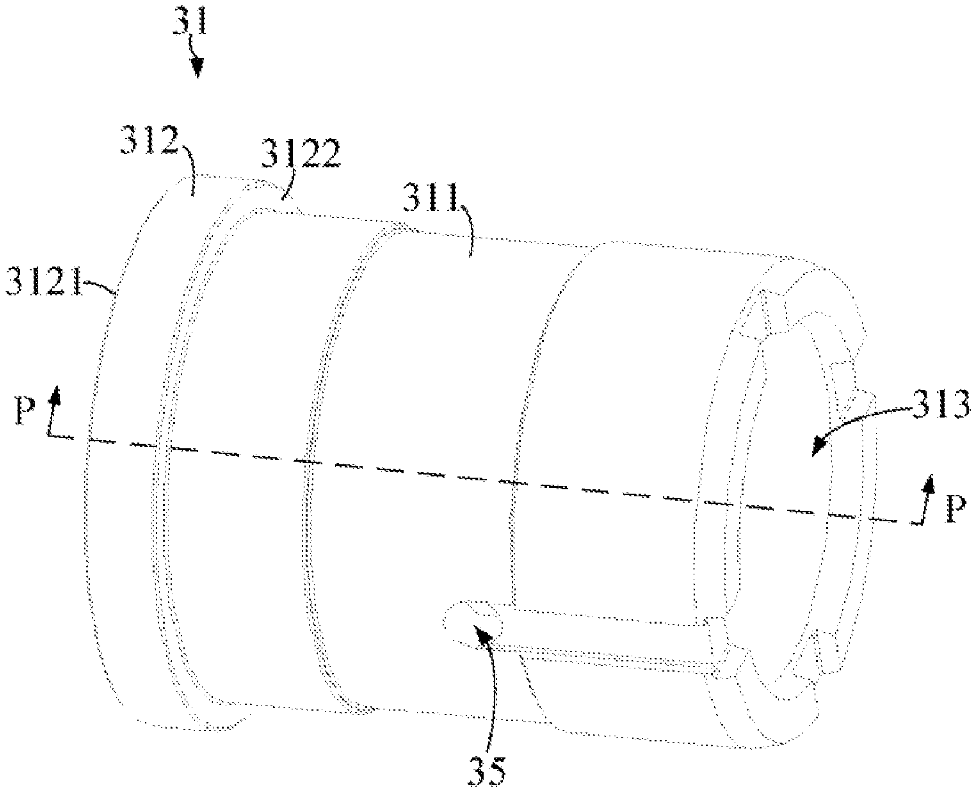
FIG. 6 is a structure diagram of a first limiting member in the compressor shown in FIG. 1.
Figure 7:
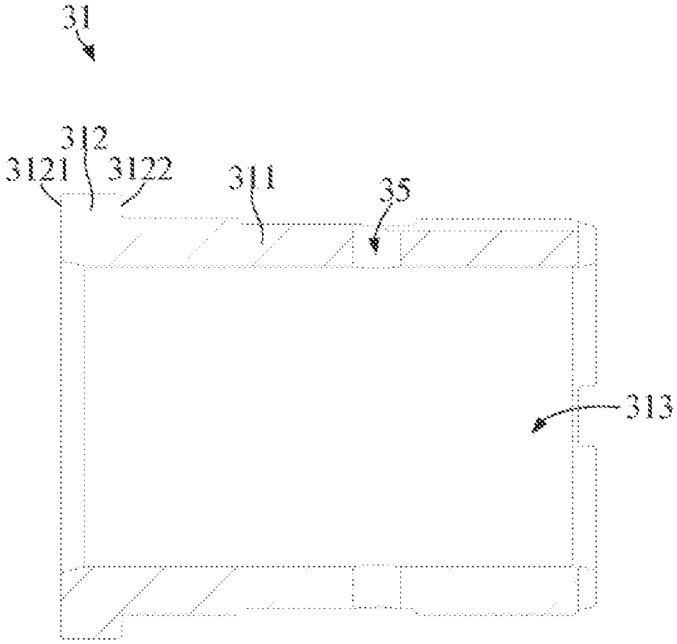
FIG. 7 is a sectional diagram of the first limiting member shown in FIG. 6 along the P-P direction.

Exemplarily, in conjunction with FIG. 2, FIG. 4. FIG. 5, FIG. 6 and FIG. 7. FIG. 6 is a structure diagram of the first limiting member in the compressor shown in FIG. 1, and FIG. 7 is a sectional diagram of the first limiting member shown in FIG. 6 along the P-P direction. The first limiting member 31 may include a first main body portion 311 and a first limiting portion 312, and the first main body portion 311 is sleeved on the first rotating shaft 20, for example, the first main body portion 311 may be provided with a first shaft hole 313, and the first limiting member 31 is sleeved on the first rotating shaft 20 through the first shaft hole 313. The first main body portion 311 may be in a circular structure, and the first limiting portion 312 is disposed around the periphery of the outer surface of the first main body portion 311. The first end surface 411 of the first rotor 41 may be provided with a first limiting groove 413, and the notch of the first limiting groove 413 faces the second rotor 42, or other the first end surface 411 is provided with this first limiting groove 413 along the axial direction of the first rotating shaft 20. The first limiting portion 312 is stuck in the first limiting groove 413 so that the first limiting portion 312 can limit the first rotor 41 through the first limiting groove 413.

It will be appreciated that the first limiting portion 312 is disposed on the periphery of the outer surface of the first main body portion 311 in a protruding manner, and when the first rotor 41 is sleeved on the first limiting member 31, the groove wall of the first limiting groove 413 of the first rotor 41 abuts against the first limiting portion 312, and the first end surface 411 of the first rotor 41 cannot move relative to the first limiting member 31 under the limit of the first limiting portion 312 of the first limiting member 31, thereby realizing the limiting effect of the first limiting member 31 on the first end surface 411 of the first rotor 41.

The structure of the second limiting member 32 may be the same as that of the first limiting member 31, for example, the second limiting member 32 may include a second main body portion 321 and a second limiting portion 322. The second main body portion 321 is sleeved on the first rotating shaft 20, for example, the second main body portion 321 may be provided with a second shaft hole 323, and the second limiting member 32 is sleeved on the first rotating shaft 20 through the second shaft hole 323. The second main body portion 321 may be in an circular structure, and the second limiting portion 322 is disposed around the periphery of the outer surface of the second main body portion 321. The third end surface 421 of the second rotor 42 may be provided with a second limiting groove 423, and the notch of the second limiting groove 423 faces the first rotor 41, or other the third end surface 421 is provided with this second limiting groove 423 along the axial direction of the first rotating shaft 20. The second limiting portion 322 is stuck in the second limiting groove 423 so that the second limiting portion 322 can limit the first rotor 42 through the second limiting groove 423.

It will be appreciated that the second limiting portion 322 is disposed on the periphery of the outer surface of the second main body portion 321 in a protruding manner, and when the second rotor 42 is sleeved on the second limiting member 32, the groove wall of the second limiting groove 423 of the second rotor 42 abuts against the second limiting portion 322, and the second end surface 421 of the second rotor 42 cannot move relative to the second limiting member 32 under the limit of the second limiting portion 322 of the second limiting member 32, thereby realizing the limiting effect of the second limiting member 32 on the third end surface 421 of the first rotor 42.

In an embodiment of the present disclosure, the position of the first end surface 411 of the first rotor 41 is limited by the first limiting member 31 and the position of the third end surface 421 of the second rotor 42 is limited by the second limiting member 32 so that a third axial clearance is maintained between the first end surface 411 of the first rotor 411 and the third end surface 421 of the second rotor 421.

Figure 8:
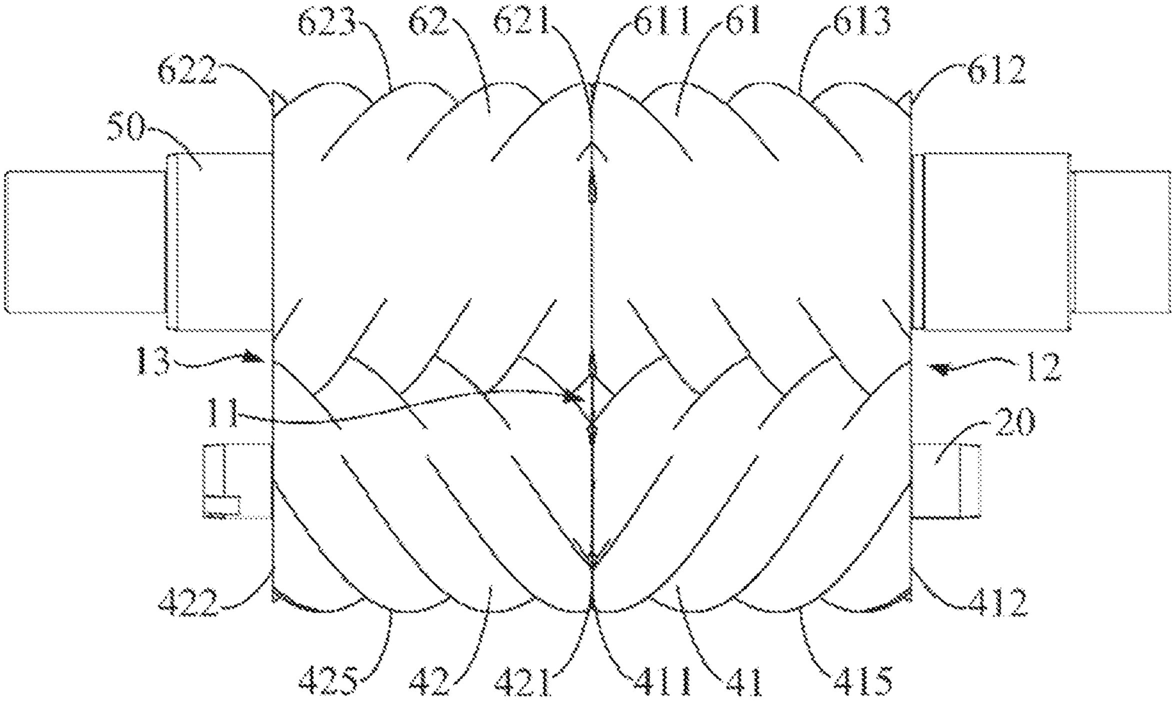
FIG. 8 is a three-dimensional structure diagram of the first rotating shaft, the second rotating shaft, the first rotor assembly and the second rotor assembly in the compressor shown in FIG. 1.

Please refer to FIGS. 3 and 8, FIG. 8 is a three-dimensional structure diagram of the first rotating shaft, the second rotating shaft, the first rotor assembly and the second rotor assembly in the compressor shown in FIG. 1, the first rotor 41 includes a first body portion 414 and a plurality of first helical blades 415, and the plurality of first helical blades 415 are disposed around the periphery of the outer surface of the first body portion 414. The first end surface 411 of the first rotor 41 includes a first part located on the first body portion 414 and a second part located on one of the first helical blades 415 close to the second rotor 42, and a first limiting groove 413 is formed in the first part. It will be appreciated that a plurality of first helical blades 415 are sequentially arranged on the first body portion 414 in a direction from the first end surface 411 to the second end surface 412 on the first body portion 414, and the end surface of the first of the first helical blades 415 and the end surface of the first body portion 414 close to the second rotor 42 are together combined into the first end surface 411. The first limiting groove 413 is formed in the end surface of the first body portion 414.

The second rotor 42 includes a second body portion 424 and a plurality of second helical blades 425, and the plurality of second helical blades 425 are disposed around the periphery of the outer surface of the second body portion 424. The third end surface 421 of the second rotor 42 includes a third part located on the second body portion 424 and a fourth part located on one of the second helical blades 425 close to the first rotor 42, and a second limiting groove 423 is formed in the third part. It will be appreciated that a plurality of second helical blades 425 are sequentially arranged on the second body portion 424 in a direction from the third end surface 421 to the fourth end surface 422 on the second body portion 424, and the end surface of the first of the second helical blades 425 and the end surface of the second body portion 424 close to the first rotor 42 are together combined into the third end surface 421. The second limiting groove 423 is formed in the end surface of the second body portion 424.

In an embodiment of the present disclosure, the first limiting portion 312 may have a first side 3121 and a second side 3122 disposed back to back, the first side 3121 is the side of the first limiting portion 312 close to the second limiting portion 322, and the second side 3122 is the side of the first limiting portion 312 away from the second limiting portion 322. The second limiting portion 322 may have a third side 3221 and a fourth side 3222 disposed back to back, the third side 3221 is the side of the second limiting portion 322 close to the first limiting portion 312, and the fourth side 3222 is the side of the second limiting portion 322 away from the first limiting portion 312.

The first side 3121 is disposed to protrude on the side of the first end surface 411 of the first rotor 41, and the third side 3221 is disposed to protrude on the side of the third end surface 421 of the second rotor 42. When the first rotor 41 and the second rotor 42 move toward a direction that they are close to each other until the first limiting member 31 and the second limiting member 32 abut against each other, since a part of the first limiting member 31 protrudes out of the end surface of the first rotor 41 and a part of the second limiting member 32 protrudes out of the end surface of the second rotor 42, the first end surface 411 of the first rotor 41 and the first end surface 411 of the first rotor 41 are spaced apart from each other, which can achieve the effect of having the third axial clearance L3 between the first rotor 41 and the second rotor 42, the first part, the second part, the third part and the fourth part together form the third axial clearance L3 therebetween.

It should be noted that the positional relationship between the first limiting member 31 and the first rotor 41 and the positional relationship between the second limiting member 32 and the second rotor 42 are not limited thereto. In some other embodiments, the first side 3121 is flush with the end surface of other parts of the first part except for the part provided with the first limiting groove 413, in a direction perpendicular to the axial direction of the first rotating shaft 20. The third side 3221 is flush with the end surface of other parts of the third part except for the part provided with the second limiting groove 423, in the direction perpendicular to the axial direction of the first rotating shaft 20.

The other parts of the first part except for the part provided with the first limiting groove 413, abut against the other parts of the third part except for the part provided with the second limiting groove 423; and moreover, the second part and the fourth part are spaced apart from each other to form the third axial clearance L3 between the second part and the fourth part.

It will be appreciated that when the first limiting member 31 and first rotor 41 and the second limiting member 32 and second rotor 42 move together in a direction that they are close to each other until the first limiting portion 312 of the first limiting member 31 and the second limiting portion 322 of the second limiting member 322 abut against each other, since the end surface of other parts of the first part except for the part provided with the first limiting groove 413, is flush with the first side 3121 of the first limiting portion 312 in the direction perpendicular to the axial direction of the first rotating shaft 20, and the end surface of the other parts of the third part except for the part provided with the second limiting groove 423, is flush with the third side 3221 of the second limit member 322 in the direction perpendicular to the axial direction of the first rotating shaft 20, the end surface of the other parts of the first part except for the part provided with the first limiting groove 413, abuts against the end surface of the other parts of the third part except for the part provided with the second limiting groove 423. In comparison with that the first side 3121 is arranged to protrude on the side of other parts of the first part except for the part provided with the first limiting groove 413 and the third side 3221 is arranged to protrude on the side of other parts of the third part except for the part provided with the second limiting groove 423, the embodiments of the present disclosure can reduce the interior space of the housing 10 occupied by the connecting assembly 30.

It will also be appreciated that in the case where the lengths of various components of the first rotor assembly 40 are fixed, when the first limiting member 31 and first rotor 41 and the second limiting member 32 and second rotor 42 move together in a direction that they are close to each other until the first limiting portion 312 of the first limiting member 31 and the second limiting portion 322 of the second limiting member 32 abut against each other, the overall length of the first rotor assembly 40 is larger if the clearance between the end surface of other pans of the first part of the first rotor 41 except for the part provided with the first limiting groove 413, and the end surface of other parts of the third part of the second rotor 42 except the part provided with the second limiting groove 423, is larger, so that the first rotor assembly 40 occupies a larger volume of the interior space of the housing 10.

In an embodiment of the present disclosure, the end surface of other parts of the first part except for the part provided with the first limiting groove 413, is arranged to be flush with the first side 3121 of the first limiting portion 312 in the direction perpendicular to the axial direction of the first rotating shaft 20, and the end surface of other parts of the third part except for the part provided with the second limiting groove 423, is arranged to be flush with the third side 3221 of the second limiting portion 322 in the direction perpendicular to the axial direction of the first rotating shaft 20, so that the first side 3121 of the first limiting member 312 abuts against the third side 3221 of the second limiting member 322, which maximumly reduces the overall length of the first rotor assembly 40, thereby reducing the interior space of the housing 10 occupied by the first rotor assembly 40.

Furthermore, the end surface of the first body portion 414 and the end surface of the second body portion 424 abut against each other, and the end surface of the first of the first helical blades 415 and the end surface of the first of the second helical blades 425 are spaced apart from each other to form the third axial clearance L3 between the second part and the fourth part. In comparison with the entire end surface of the first rotor 41 and the entire end surface of the second rotor 42 being spaced apart from each other, the embodiment of the present disclosure not only can achieve no mutual interference between the first helical blades 415 of the first rotor 41 and the second helical blades 425 of the second rotor 42, but also can shorten the length of the first rotor assembly 40 in the housing 10 due to the setting of the third axial clearance U.

Figure 9:
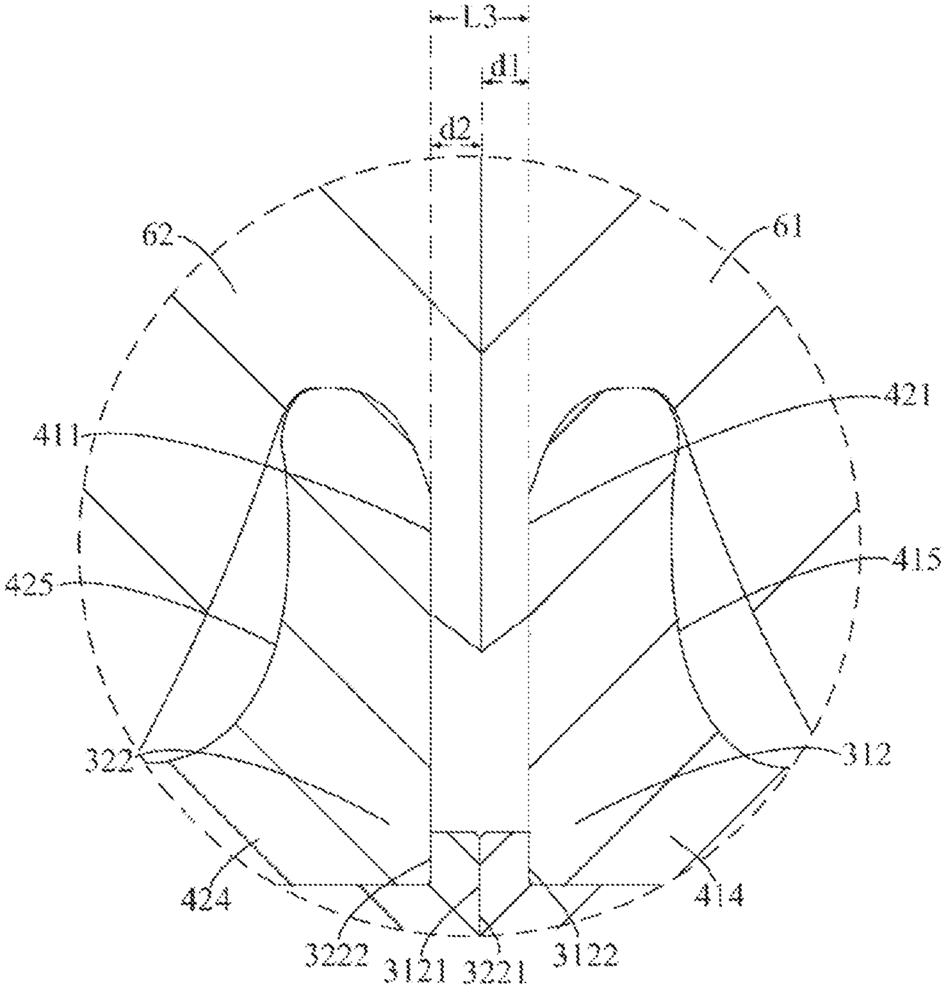
FIG. 9 is a second structure diagram of the first rotating shaft, the first rotor assembly and the connecting assembly shown in FIG. 2.

In some other embodiments, as shown in FIG. 9, FIG. 9 is a second structure diagram of the first rotating shaft, the first rotor assembly and the connecting assembly shown in FIG. 2. The first rotor 41 is not provided with the first limiting groove 413, and the second rotor 42 is not provided with the second limiting groove 423. Alternatively, the first end surface 411 of the first rotor 41 is directly abutted against the side of the first limiting portion 312 away from the second rotor 42, and the third end surface 421 of the second rotor 42 is abutted against the side of the second limiting portion 322 away from the first rotor 41, thereby having the third axial clearance L3 between the first rotor 41 and the second rotor 42. It will be appreciated that in an embodiment of the present disclosure, when the first limiting member 31 and the second limiting member 32 abut against each other, due to the obstruction of the first limiting portion 312 of the first limiting member 31 and the second limiting portion 322 of the second limiting member 32, the first end surface 411 of the first rotor 41 will not abut against the third end surface 421 of the second rotor 42, or other a clearance is always present between the first end surface 411 of the first rotor 41 and the third end surface 421 of the second rotor 42.

It should be noted that in other embodiments, a limiting groove may also be formed for the first rotor 41, and the first rotor 41 is clamped with the first limiting member 31 through the limiting slot; and the third end surface 421 of the second rotor 42 directly abuts against the second limiting portion 322 of the second limiting member 32. Alternatively, the second rotor 42 is provided with a limiting slot, and the second rotor 42 is clamped with the second limiting member 32 through the limiting slot; and the first end surface 411 of the first rotor 41 directly abuts against the first limiting portion 312 of the first limit member 31.

In an embodiment of the present disclosure, the first limiting member 31 and the second limiting member 32 are separately formed into two components, and in other embodiments, the first limiting member 31 and the second limiting member 32 may also be integrally formed into one component.

In an embodiment of the present application, the connecting assembly 30, the first rotor 41 and the second rotor 42 can rotate around the first rotating shaft 20 together in the housing 10. As an axial force along the axial direction of the first rotating shaft 20 is generated due to different pressures on the two sides of the first rotor 41 and on the two sides of the second rotor 42 in the rotating process, the first rotor 41 and the second rotor 42 may move in the axial direction of the first rotating shaft 20 under the action of this axial force, and at this point, if the amounts of axial movement of the first rotor 41 and the second rotor 42 are too large, it may result in that the first rotor 41 and the second rotor 42 produce an interference issue.

Based on this, an embodiment of the present disclosure starts from practical problems, the first rotor 41 and the second rotor 42 are limited by the connecting assembly 30, so that the clearance between the first rotor 41 and the second rotor 42 is larger than the amount of axial movement that the first rotor assembly 40 (including the first rotor 41 and the second rotor 42) moves along the axial direction of the first rotating shaft, thereby avoiding occurrence of the above problems.

In an embodiment of the present application, the third axial clearance L3 is set to be greater than the first axial clearance L1 and greater than the second axial clearance L2, i.e., L3>L1 and L3 is greater than L2. Wherein the first axial clearance L1 is the clearance between the second end surface 412 of the first rotor 41 and the end surface of the housing 10 adjacent to the first rotor 41 in the axial direction of the first rotating shaft 20; and the second axial clearance L2 is the clearance between the fourth end surface 422 of the second rotor 42 and the end surface of the housing 10 adjacent to the second rotor 42 in the axial direction of the first rotating shaft 20. Please further refer to FIGS. 2, 4 and 5, the connecting assembly 30 of an embodiment of the present disclosure may further include a third limiting member 33 and a fourth limiting member 34; the third limiting member 33 is configured to limit the distance between the second end surface 412 of the first rotor 41 and the housing 10 such that there exists the first axial clearance L1 between the second end surface 412 of the first rotor 41 and the housing 10; and the fourth limiting member 34 is configured to limit the distance between the fourth end surface 422 of the second rotor 42 and the housing 10 such that there exists the second axial clearance L2 between the fourth end surface 422 of the second rotor 42 and the housing 10.

The third limiting member 33 may include a third main body portion 331 and a third limiting portion 332, the third main body portion 331 is sleeved on the first rotating shaft 20 and disposed adjacent to the first main body portion 311, and the third limiting portion 332 is disposed around the periphery of the outer surface of the third main body portion 331. The third limiting portion 331 may have a fifth side 3311 and a sixth side 3312, the fifth side 3311 is the side of the third limiting portion 331 away from the housing 10, the sixth side 3312 is the side of the third limiting portion 331 close to the housing 10, and the fifth side 3311 abuts against the second end surface 412 of the first rotor 41. The fourth limiting member 34 may include a fourth main body portion 341 and a fourth limiting portion 342, the fourth main body portion 341 is sleeved on the first rotating shaft 20 and disposed adjacent to the second main body portion 321, and the fourth limiting portion 342 is disposed around the periphery of the outer surface of the third main body portion 341. The fourth limiting portion 341 may have a seventh side 3421 and an eighth side 3422, the seventh side 3421 is the side of the fourth limiting portion 341 away from the housing 10, the eighth side 3422 is the side of the fourth limiting portion 341 close to the housing 10, and the fourth limiting portion 341 abuts against the second end surface 412 of the first rotor 41.

In an embodiment of the present disclosure, the third limiting member 33 and the fourth limiting member 34 may both have the same structure as the first limiting member 31 as shown in FIG. 6. The second end surface 412 of the first rotor 41 and the fourth end surface 422 of the second rotor 42 may also be each provided with a limiting slot, and clamped with the third limiting member 33 and the fourth limiting member 34 respectively through the limiting slots.

As shown in FIG. 4, the second end surface 421 of the first rotor 41 may be provided with a third limiting groove 416, and the notch of the third limiting groove 416 faces the housing 10, or other the second end surface 421 is provided with this third limiting groove 416 along the axial direction of the first rotating shaft 20. The third limiting portion 331 is stuck in the third limiting groove 416, so that the third limiting portion 331 can limit the second end surface 412 of the first rotor 41 through the third limiting groove 416. It will be appreciated that the third limiting portion 332 is disposed on the periphery of the outer surface of the third main body portion 331 in a protruding manner, the first rotor 41 is sleeved on both the first limiting member 31 and the third limiting member 33, the first limiting member 31 is used to limit the first end surface 411 of the first rotor 41, and the third limiting member 33 is used to limit the second end surface 412 of the first rotor 42. When the first rotor 41 is sleeved on the third limiting member 33, the groove wall of the third limiting groove 416 of the first rotor 41 abuts against the third limiting portion 331, and the first end surface 412 of the first rotor 41 cannot move relative to the third limiting member 33 under the limit of the third limiting portion 331 of the third limiting member 33, thereby realizing the limiting effect of the third limiting member 33 on the second end surface 412 of the first rotor 41.

As shown in FIG. 5, the fourth end surface 422 of the second rotor 42 may be provided with a fourth limiting groove 426, and the notch of the fourth limiting groove 426 faces the housing 10, or other the fourth end surface 422 is provided with this fourth limiting groove 426 along the axial direction of the first rotating shaft 20. The fourth limiting portion 342 is stuck in the fourth limiting groove 426 so that the fourth limiting groove 426 can limit the fourth limiting groove 426 of the second rotor 42 through the fourth limiting groove 426.

It will be appreciated that the fourth limiting portion 342 is disposed on the periphery of the outer surface of the fourth main body portion 341 in a protruding manner, the second rotor 42 is sleeved on both the second limiting member 32 and the fourth limiting member 34, the second limiting member 32 is used to limit the third end surface 421 of the second rotor 42, and the fourth limiting member 34 is used to limit the fourth end surface 422 of the second rotor 42. When the second rotor 42 is sleeved on the fourth limiting member 34, the groove wall of the fourth limiting groove 426 of the second rotor 42 abuts against the fourth limiting portion 342, and the fourth end surface 422 of the second rotor 42 cannot move relative to the fourth limiting member 34 under the limit of the fourth limiting portion 342 of the fourth limiting member 34, thereby realizing the limiting effect of the fourth limiting member 34 on the fourth end surface 422 of the second rotor 42.

In an embodiment of the present disclosure, the position of the second end surface 412 of the first rotor 41 is limited by the third limiting member 33 such that there exists the first axial clearance L1 between the second end surface 412 of the first rotor 41 and the housing 10, and the position of the fourth end surface 422 of the second rotor 42 is limited by the fourth limiting member 34 such that there exists the second axial clearance L2 between the fourth end surface 422 of the second rotor 42 and the housing 10.

Since the connecting assembly 30 rotates synchronously with the first rotor assembly 40, shaft friction with the first rotor assembly 40 may be generated during operation to result in wear of the connecting assembly 30. To this end, in an embodiment of the present disclosure, the connecting assembly 30 may include a tin bronze material, i.e., the connecting assembly 30 may be made of the tin bronze material, which is a bronze material with tin as the main alloy element and with the tin content generally between 3% and 14%. The material has the characteristics of corrosion resistance and wear resistance, and has better mechanical properties and process properties, which can improve the wear resistance performance of the connecting assembly 30.

In an embodiment of the present disclosure, in order to avoid too high friction temperature when the connecting assembly 30 and the first rotor assembly 40 generate shaft friction, the embodiment of the present disclosure may further provide an oil supply passage in both the first rotating shaft 20 and the connecting assembly 30, and refrigeration oil or other oil is supplied to the oil supply passage for lubrication and cooling through an oil supply component located outside the housing 10, so as to reduce the friction between the connecting assembly 30 and the first rotor assembly 40 to ensure the reliable operation of the compressor 200.

Figure 10:
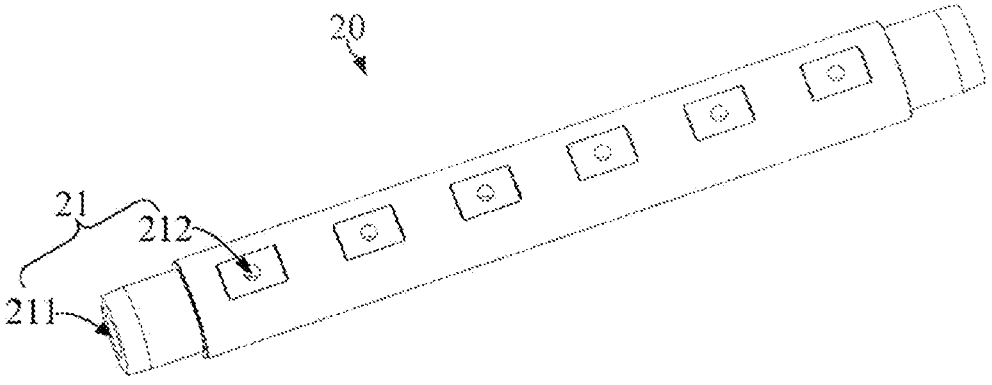
FIG. 10 is a structure diagram of the first rotating shaft in the compressor shown in FIG. 1.

Exemplarily, in conjunction with FIGS. 2 and 10, FIG. 10 is a structure diagram of the first rotating shaft in the compressor shown in FIG. 1. The connecting assembly 30 is provided with a plurality of first oil supply passages 35. One limiting member may be provided with one or more first oil supply passages 36 (e.g., the first limit member 31, the second limit member 32, the third limit member 33, and the fourth limit member 34 are each provided with a first oil supply passage 35). The first rotating shaft 20 is provided with a main oil supply passage 211 along the axial direction of the first rotating shaft 20, and a plurality of auxiliary oil supply passages 212 in communication with the main oil supply passage 211 are formed in a second direction perpendicular to the axial direction of the first rotating shaft 20. The main oil supply passage 211 and the plurality of auxiliary oil supply passages 212 together form the second oil supply passage 21, and the second oil supply passage 21 is in communication with the plurality of first oil supply passages 35 through the plurality of auxiliary oil supply channels 212. During the actual operation, refrigeration oil or other oil can be fed into the main oil supply passage 211 of the first rotating shaft 20 through the oil supply component located in the housing 10, and the main oil supply passage 211 causes the refrigeration oil or other oil to flow between the first rotating shaft 20 and the connecting assembly 30 through the plurality of auxiliary oil supply passages 212 to lubricate and cool the contact surface of the first rotating shaft 20 and the connecting assembly 30. Refrigeration oil or other oil may flow between the connecting assembly 20 and the first rotor assembly 40 through the plurality of first oil supply passages 35 to lubricate or cool the connecting assembly 20 and the first rotor assembly 40.

Please refer to FIGS. 1 and 8, the compressor 200 in an embodiment of the present disclosure may further include a second rotating shaft 50 and a second rotor assembly 60, the second rotating shaft 50 is mounted within the housing 10, and the second rotating shaft 50 is disposed parallel to the first rotating shaft 20 in the axial direction of the second rotating shaft 50. The second rotor assembly 60 may include a third rotor 61 and a fourth rotor 62 coaxially disposed on the second rotating shaft 50. The second rotating shaft 50 is configured to drive the second rotor assembly 60 to rotate along a direction opposite to the rotating direction of the first rotor assembly 40, the third rotor 61 is engaged with the first rotor 41 and the fourth rotor 62 is engaged with the second rotor 42.

It will be appreciated that the first rotor assembly 20 may be a negative rotor assembly and the second rotor assembly 60 may be a positive rotor assembly, the second rotor assembly 60 as the positive rotor assembly is an active rotor assembly, and the first rotor assembly 40 as the negative rotor assembly may be a slave rotor assembly. By way of example, the second rotating shaft 50 may be connected to a drive assembly such as a motor in a transmission manner, and the first rotating shaft 50 may be driven to rotate by the drive assembly. The first rotating shaft 50 drives the second rotor assembly 60 to rotate together when it rotates, and the second rotor assembly 60 drives the first rotor assembly 40 to rotate about the first rotating shaft 20 when it rotates.

During the rotation of the first rotor assembly 40 and the second rotor assembly 60, as the first rotor assembly 40 and the second rotor assembly 60 will generate axial movement under the action of the axial force, if they move such that the two rotors of the first rotor assembly 40 and the two rotors of the second rotor assembly 60 are misaligned and engaged, the two rotors of the first rotor assembly 40 and the two rotors of the second rotor assembly 60 interfere with each other, resulting in occurrence of scraping or even strangulation of the four rotors.

Based on this, in an embodiment of the present disclosure, the end surface of the third rotor 61 close to the fourth rotor 62 protrudes out of the end surface of the first rotor 41 close to the second rotor 42, and the end surface of the fourth rotor 62 close to the third rotor 61 protrudes out of the end surface of the second rotor 42 close to the first rotor 41. The embodiment of the present disclosure can ensure that the first rotor 41 does not interfere with the fourth rotor 62 and the second rotor 31 does not interfere with the third rotor 61.

It will be appreciated that the third rotor 61 may have a fifth end surface 611 and a sixth end surface 612 disposed back to back, the fifth end surface 611 is the side close to the fourth rotor 62 and the sixth end surface 612 is the side away from the fourth rotor 62, wherein the fifth end surface 611 of the third rotor 61 is higher than the first end surface 411 of the first rotor 41 in the axial direction of the second rotating shaft 50, which can ensure that a part of the third rotor 61 is always located within the clearance between the first rotor 41 and the second rotor 42. The fourth rotor 62 may have a seventh end surface 621 and an eighth end surface 622 disposed back to back, the seventh end surface 621 is the side close to the third rotor 61 and the eighth end surface 622 is the side away from the third rotor 61, wherein the seventh end surface 621 of the fourth rotor 62 is higher than the third end surface 421 of the second rotor 42 in the axial direction of the second rotating shaft 50, which can ensure that a part of the fourth rotor 62 is always located within the clearance between the first rotor 41 and the second rotor 42. A part of the third rotor 61 disposed in the first rotor 41 and the second rotor 42 (i.e., the part above the first end surface 411 of the first rotor 41) can limit the seventh end surface 621 of the fourth rotor 62 such that a clearance is always present between the seventh end surface 621 of the fourth rotor 62 and the first end surface 411 of the first rotor 41 without mutual interference. At the same time, a part of the fourth rotor 62 disposed in the first rotor 41 and the second rotor 42 (i.e., the part above the third end surface 421 of the second rotor 42) may limit the fifth end surface 611 of the third rotor 61 such that a clearance is always present between the fifth end surface 611 of the third rotor 61 and the third end surface 421 of the second rotor 42 without mutual interference.

In an embodiment of the present disclosure, the first rotor assembly 40 is limited by the connecting assembly 30 such that a third axial clearance L3 is maintained between the first rotor 41 and the second rotor 42 of the first rotor assembly 40, and the adjacent end surfaces of both the third rotor 61 and the fourth rotor 62 of the second rotor assembly 60 in the embodiment of the present disclosure are higher than the adjacent end surfaces of the first rotor 41 and the second rotor 42, respectively, thereby ensuring that the two pairs of rotors located in diagonal positions in the first rotor assembly 40 and the second rotor assembly 60 do not interfere with each other to avoid the occurrence of scraping and strangulation of the rotors.

As shown in FIG. 8, the fifth end surface 611 of the third rotor 61 is joined with the seventh end surface 621 of the fourth rotor 62, i.e., the adjacent end surfaces of the third rotor 61 and the fourth rotor 62 are joined, and compared to arrange the third rotor 61 and the fourth rotor 62 to be spaced apart from each other, the embodiment of the present disclosure can reduce the overall length of the second rotor assembly 60, thereby reducing the interior space of the housing 10 occupied by the second rotor assembly 60.

Of course, in some other embodiments, it is possible to arrange the third rotor 61 and the fourth rotor 62 to be spaced apart from each other, and the effect of ensuring that the two pairs of rotors located in diagonal positions do not interfere with each other can also be achieved as along as it ensures that the adjacent end surfaces of the third rotor 61 and the fourth rotor 62 are both located within the clearance between the first rotor 41 and the second rotor 42.

As shown in FIG. 3, in an embodiment of the present disclosure, the fifth end surface 611 of the third rotor 61 has a distance d1 from the first end surface 411 of the first rotor 41 in the axial direction of the second rotating shaft 50, and d1 may be 0.2 mm, 0.3 mm, 0.4 mm, or some other smaller value. The distance between the seventh end surface 621 of the fourth rotor 62 in the axial direction of the second rotating shaft 50 and the third end surface 421 of the second rotor 42 is d2, and d2 may be 0.2 mm, 0.3 mm, 0.4 mm, or other smaller value. Wherein d1=d2 and d1+d2=L3. i.e., the distance between the fifth end surface 611 of the third rotor 61 and the first end surface 411 of the first rotor 41 in the axial direction of the second rotating shaft 50 is equal to the distance between the seventh end surface 621 of the fourth rotor 62 and the third end surface 421 of the second rotor 42 in the axial direction of the second rotating shaft 50, and the sum of the two distances is equal to the third axial clearance L3 between the first rotor 41 and the second rotor 42.

In the actual working of the compressor 200, the second rotating shaft 50 and the second rotor assembly 60 are affected by the axial forces applied thereto to move in the axial direction of the second rotating shaft 50.

When the third rotor 61 and the fourth rotor 62 move, it is assumed that the amount of axial movement that the third rotor 61 moves in the housing 10 along the axial direction of the second rotating shaft 50 toward the direction close to the fourth rotor 62 is D1, the amount of axial movement that the second rotor 42 moves toward a direction close to the first rotor 41 is D2, the amount of axial movement that the fourth rotor 62 moves in the housing 10 along the axial direction of the second rotating shaft 50 toward a direction close to the third rotor 61 is D3, the amount of axial movement that the first rotor 41 moves toward a direction close to the second rotor 42 is D4, and the second rotor assembly 60 is configured to satisfy: L3>D1+D2, and L3>D3+D4, so as to ensure that the fifth end surface 611 of the third rotor 61 does not interfere with the third end surface 612 of the second rotor 42, and the seventh end surface 621 of the fourth rotor 62 does not interfere with the first end surface 411 of the first rotor 41.

It will be appreciated that in the case that the first rotor assembly 40 can generate axial movement and the second rotor assembly 60 can generate axial movement, when the sum of the amounts of axial movement that the two pairs of rotors located in diagonal positions move axially in a direction that they are close to each other is less than the clearance between the first rotor 41 and the second rotor 42, it is possible that a clearance or exactly zero clearance is always present between the two pairs of rotors located in diagonal positions, thereby allowing the two sets of rotors in diagonal positions not to interfere with each other.

In conjunction with FIGS. 1 and 8, the housing 10 further has a suction port 11, a first exhaust port 12, and a second exhaust port 13 in communication with an accommodating space of the housing 10 for accommodating the first rotating shaft 20, the connecting assembly 30, the first rotor assembly 40, the second rotating shaft 50 and the second rotor assembly 60. The suction port 11 is used to, when the first rotor assembly 40 and the second rotor assembly 60 are engaged to rotate, transfer the gas outside the housing 10 to the accommodating space inside the housing 10. The first exhaust port 12 and the second exhaust port 13 are used to, when the first rotor assembly 40 and the second rotor assembly 60 are engaged to rotate, compress the gas in the accommodating space of the housing 10 to be outside of the housing 10. Thus, the process of suction, compression and exhaust of the compressor 200 can be achieved.

The suction port 11 is located adjacent to the first rotor 41, the second rotor 42, the third rotor 61 and the fourth rotor 62, and the first end surface of the first rotor 41, the third end surface of the second rotor 42, the fifth end surface 611 of the third rotor 61 and the seventh surface of the fourth rotor 621 are all suction end surfaces adjacent to the suction port 11. The first exhaust port 12 is located at the adjacent position of the first rotor 41, the third rotor 61 and the housing 10, and the second end surface 412 of the first rotor 41 and the sixth end surface 612 of the third rotor 61 are both exhaust end surfaces adjacent to the first exhaust port 12. The second exhaust port 13 is located at the adjacent position of the second rotor 42, the fourth rotor 62 and the housing 10, and the fourth end surface 422 of the second rotor 42 and the eighth end surface 622 of the fourth rotor 62 are both exhaust end surfaces adjacent to the second exhaust port 13.

It will be appreciated that the suction port 11 is located in the middle of the housing 10 along the axial direction of the first rotor 30, and the first exhaust port 12 and the second exhaust port 13 are located at two ends of the housing 10 along the axial direction of the first rotating shaft 20.

In the process of compressing the gas, the compressor 200 generates an axial force on the two pairs of rotor assemblies due to different pressures of the gas at the suction and exhaust ports, which form the main load during operation of the compressor. In addition, the axial force always points from the exhaust port to the suction port, and in related technologies, it usually balances this axial force by the means of adding thrust bearings on both sides of the rotating shaft, but too many thrust bearings lead to excessive operation losses and reduce the efficiency of the compressor.

Based on this, in an embodiment of the present disclosure, the helical direction of the first rotor 41 and the helical direction of the second rotor 42 are configured as opposite directions, such that when the first rotor assembly 40 and the second rotor assembly 60 are engaged with each other to rotate, opposite axial forces are generated between the first rotor 41 and the second rotor 42, which can also be understood as opposite axial flows generated between the first rotor 41 and the second rotor 42. Due to the symmetry of the axial forces, opposite axial forces generated between the first rotor 41 and the second rotor 42 can almost be counteracted.

It will be appreciated that, as described in the above embodiment of the application, the first rotor 41 may have a plurality of first helical blades 415 and the second rotor 42 has a plurality of second helical blades 425, and the number of the first helical blades 415 is the same as the number of the second helical blades 425. By setting the helical direction of the first helical blades 415 and the helical direction of the second helical blades 425 to be opposite directions, for example, by configuring one to be helical toward left and configuring the other to be helical toward right, opposite spiral directions of the first rotor 41 and the second rotor 42 can be achieved.

Furthermore, in an embodiment of the present disclosure, the helical direction of the third rotor 61 and the helical direction of the fourth rotor 62 are also configured as opposite directions, such that when the first rotor assembly 40 and the second rotor assembly 60 are engaged with each other to rotate, opposite axial forces are generated between the third rotor 61 and the fourth rotor 62, which can also be understood as opposite axial flows generated between the third rotor 61 and the fourth rotor 62. Due to the symmetry of the axial forces, opposite axial forces generated between the first rotor 41 and the second rotor 42 can almost be counteracted. It will be appreciated that, the third rotor 61 may have a plurality of third helical blades 613 and the fourth rotor 62 has a plurality of fourth helical blades 623, and the number of the fourth helical blades 623 is the same as the number of the third helical blades 613. By setting the helical direction of the third helical blades 613 and the helical direction of the fourth helical blades 623 to be opposite directions, for example, by configuring one to be helical toward left and configuring the other to be helical toward right, opposite helical directions of the third rotor 61 and the fourth rotor 62 can be achieved.

In an embodiment of the present disclosure, the third rotor 61 may be integrally formed with the second rotating shaft 50; and the fourth rotor 62 may be directly sleeved on the second rotating shaft 50 and fixedly connected with the second rotating shaft 50, for example, the fourth rotor 62 may have a shaft hole 624 that fits the second rotating shaft 50, and the shaft hole 624 is in tight fit with the second rotating shaft 50 so that the fourth rotor 63 is sleeved on and connected to the second rotating shaft 50. In other embodiments of the present disclosure, the third rotor 61 and the fourth rotor 62 may both be integrally formed with the second rotating shaft 50, or the third rotor 61 and the fourth rotor 62 may be sleeved on the second rotating shaft 520.

In the actual machining process, the helical direction of the third rotor 61 cannot be machined to be completely opposite to the helical direction of the fourth rotor 62 due to the influence of the machining process, i.e., the axial forces between the third rotor 61 and the fourth rotor 62 cannot be completely counteracted. Based on this, as shown in FIG. 1, the compressor 200 in an embodiment of the present disclosure further includes a thrust bearing 70 disposed on one side of the second rotating shaft 50. A small amount of the remaining axial forces between the third rotor 61 and the fourth rotor 62 is balanced out by means of the thrust bearing 70, so as to balance the forces on the third rotor 61 and the fourth rotor 62.

The compressor 200 further includes a drive motor 80 disposed on the other side of the second rotating shaft 50, for example, the second rotating shaft 50 may have a first end 51 and a second end 52 disposed back to back, the thrust bearing 70 is sleeved on the first end 51, the second end 52 is connected with the drive motor 80 in a transmission manner, and the drive motor 80 is configured to drive rotation of the second rotating shaft 50 so as to drive the second rotor assembly 60 to rotate and drive the first rotor assembly 40 and the connecting assembly 30 to rotate about the first rotating shaft 20 together.

In an embodiment of the present disclosure, the end surface of the third rotor 61 away from the fourth rotor 62 is flush with the end surface of the first rotor 41 away from the second rotor 42 in a direction perpendicular to the axial direction of the second rotating shaft 50. The end surface of the fourth rotor 62 away from the third rotor 61 is flush with the end surface of the second rotor 42 away from the first rotor 41 in a direction perpendicular to the axial direction of the second rotating shaft 50.

Exemplarily, as shown in FIG. 8, the sixth end surface 621 of the third rotor 61 is flush with the second end surface 412 of the first rotor 41 in a first direction, i.e., the exhaust end surface of the third rotor 61 is flush with the exhaust end surface of the first rotor 41. The eighth end surface 62 of the fourth rotor 62 is flush with the fourth end surface 422 of the second rotor 42 in the first direction, and the exhaust end surface of the fourth rotor 62 is flush with the exhaust end surface of the second rotor 41. With the axial forces of the first rotor assembly 40 and the second rotor assembly 60 balanced, it can ensure that a clearance is maintained between the exhaust end surfaces of all the negative and positive rotors and the housing 10, and the same clearance is also maintained between the exhaust end surfaces of the negative and positive rotors and the housing 10.

As shown in FIG. 1, the housing 10 may include an enclosure 14, a first bearing house 15, and a second bearing house 16.

The first bearing house 15 is disposed on the side of the exhaust end surfaces of the first rotor 41 and the third rotor 61, or other a part of the first bearing house 15 is disposed on the side of the second end surface 412 of the first rotor 41 and the other part of the first bearing house 15 is disposed on the side of the sixth end surface 412 of the third rotor 42. Furthermore, the first bearing house 15 is also located between the first rotor 41 and the drive assembly 80, and the first bearing house 15 is used to carry the first end 51 of the second rotating shaft 50 and the end of the first rotating shaft 20 close to the first rotor 41.

The second bearing house 16 is disposed on the side of the exhaust end surfaces of the second rotor 42 and the fourth rotor 62, or other a part of the second bearing house 16 is disposed on the side of the fourth end 422 of the second rotor 42 and the other part of the first bearing house 15 is disposed on the side of the eighth end 622 of the fourth rotor 62. The second bearing house 16 is used to carry the second end 52 of the second rotor 30 and the end of the second rotating shaft 20 close to the third rotor 42.

The compressor 200 may further include a first radial bearing 91 and a second radial bearing 92, the first radial bearing 91 is sleeved on the first end 51 of the second rotating shaft 50, and the outer surface of the first radial bearing 91 is affixed to the first bearing house 15. For example, the first bearing house 15 may be provided with a mounting groove, and the first radial bearing 91 is mounted in the mounting groove and affixed to the wall of the mounting groove.

The second radial bearing 92 is sleeved on the second end 52 of the second rotating shaft 50, and the second radial bearing 92 is disposed on the side of the thrust bearing 70 close to the third rotor 42, and the outer surface of the thrust bearing 70 and the outer surface of the second radial bearing 92 are each affixed to the second bearing house 16. For example, the second bearing house 16 may also be provided with a mounting groove, and the thrust bearing 70 and the second radial bearing 92 are each mounted in the mounting groove and affixed to the wall of the mounting groove. The second radial bearing 92 and the first radial bearing 91 are used to work together to balance the radial force of the second rotating shaft 50. Wherein both ends of the first rotating shaft 30 may be fixed to the first bearing house 15 and the second bearing house 13, respectively.

The third limiting member 33 and the fourth limiting member 34 in the embodiment of the present disclosure may limit the exhaust end surface of the first rotor 41 so that there exists a clearance between the first rotor 41 and the first bearing house 15 and a clearance is present between the second rotor 42 and the second bearing house 14, which may ensure that the exhaust end surface of the first rotor 41 does not collide with the end surface of the first bearing house 15, and the exhaust end surface of the second rotor 42 does not collide with the end surface of the second bearing house 13, or other the exhaust end surfaces of the two sets of negative and positive rotors are all separated from the end surfaces of the bearing houses.

The compressor 200 in one or more embodiments above can be applied to air conditioners.

An embodiment of the present disclosure further provides an air conditioner including a compressor 200 as defined by combination of one or more embodiments above.

The compressor and air conditioner provided in the embodiments of the present disclosure have been described in detail above. Specific individual examples have been applied herein to illustrate the principles and implementations of the present disclosure, and the illustration of the above embodiments is merely intended to help understand the present disclosure. At the same time, for a person skilled in the art, there will be changes in the specific implementations and application scope based on the ideas of the present disclosure, and in summary, the contents of this specification should not be understood as a limitation to the present disclosure.

The invention claimed is:

1. A compressor, comprising:
- a housing;
- a first rotating shaft mounted in the housing;
- a connecting assembly sleeved on the first rotating shaft; and
- a first rotor assembly comprising a first rotor and a second rotor coaxially disposed on the connecting assembly, the connecting assembly configured to carry the first rotor and the second rotor to rotate about the first rotating shaft together;
- the connecting assembly is configured to limit the relative positions of the first rotor and the second rotor, such that there exists a clearance between the first rotor and the second rotor,
- wherein the distance between an end surface of the first rotor close to the second rotor and an end surface of the second rotor close to the first rotor in the axial direction of the first rotating shaft increases gradually from the axis of the first rotor assembly to the outer periphery of the first rotor assembly.

2. The compressor according to claim 1, wherein there exists a first axial clearance between an end surface of the first rotor away from the second rotor and an end surface of the housing close to the first rotor, there exists a second axial clearance between an end surface of the second rotor away from the first rotor and an end surface of the housing close to the second rotor, and the connecting assembly is configured to limit that the clearance between the first rotor and the second rotor is greater than the first axial clearance and the clearance between the first rotor and the second rotor is greater than the second axial clearance.

3. The compressor according to claim 1, comprising:
- a second rotating shaft mounted in the housing; and
- a second rotor assembly comprising a third rotor and a fourth rotor which are coaxially disposed on the second rotating shaft, the second rotating shaft being configured to drive the second rotor assembly to rotate along a direction opposite to the rotating direction of the first rotor assembly, the third rotor and the first rotor being engaged with each other, and the fourth rotor and the second rotor being engaged with each other.

4. The compressor according to claim 3, wherein an end surface of the third rotor close to the fourth rotor protrudes out of an end surface of the first rotor close to the second rotor, and an end surface of the fourth rotor close to the third rotor protrudes out of an end surface of the second rotor close to the first rotor, so that the first rotor does not interfere with the fourth rotor and the second rotor does not interfere with the third rotor.

5. The compressor according to claim 3, wherein adjacent end surfaces of the third rotor and the fourth rotor are joined.

6. The compressor according to claim 3, wherein there exists a distance d1 between an end surface of the third rotor close to the fourth rotor and an end surface of the first rotor close to the second rotor in the axial direction of the second rotating shaft, and there exists a distance d2 between an end surface of the fourth rotor close to the third rotor and an end surface of the second rotor close to the first rotor in the axial direction of the second rotating shaft, and the second rotor assembly is configured to satisfy: $d2=d1$.

7. The compressor according to claim 3, wherein the clearance between the first rotor and the second rotor is L3, the amount of axial movement that the third rotor moves in the housing along the axial direction of the second rotating shaft toward a direction close to the fourth rotor is D1, the amount of axial movement that the second rotor moves toward a direction close to the first rotor is D2, the amount of axial movement that the fourth rotor moves in the housing along the axial direction of the second rotating shaft toward a direction close to the third rotor is D3, the amount of axial movement that the first rotor moves toward a direction close to the second rotor is D4, and the second rotor assembly is configured to satisfy: $L3 \geq D1+D2$, and $L3 \geq D3+D4$.

8. The compressor according to claim 3, wherein a suction port is arranged adjacent to the first rotor, the second rotor, the third rotor and the fourth rotor, a first exhaust port is arranged adjacent to the first rotor, the third rotor and the housing, and a second exhaust port is arranged adjacent to the second rotor, the fourth rotor and the housing.

9. The compressor according to claim 3, wherein the first rotor has a helical direction opposite to that of the second rotor, and the third rotor has a helical direction opposite to that of the fourth rotor.

10. The compressor according to claim 3, wherein the third rotor is integrally formed with the second rotating shaft, and the fourth rotor has a shaft hole that fits the second rotating shaft, and the rotating shaft is in tight fit with the second rotating shaft.

11. The compressor according to claim 3, further comprising a thrust bearing disposed on one side of the second rotating shaft and a motor disposed on the other side of the second rotating shaft, wherein the motor is configured to drive the second rotating shaft to rotate, so that the second rotor assembly follows the rotation of the second rotating shaft and drives the first rotor assembly and the connecting assembly to rotate together around the first rotating shaft.

12. The compressor according to claim 3, wherein an end surface of the third rotor away from the fourth rotor is flush with the end surface of the first rotor away from the second rotor in a direction perpendicular to the axial direction of the second rotating shaft; and an end surface of the fourth rotor away from the third rotor is flush with an end surface of the second rotor away from the first rotor in a direction perpendicular to the axial direction of the second rotating shaft.

13. The compressor according to claim 1, wherein the connecting assembly comprises a first limiting member and a second limiting member both sleeved on the first rotating shaft and both rotatable around the first rotating shaft, the first limiting member is configured to limit the position of an end surface of the first rotor close to the second rotor, and the second limiting member is configured to limit the position of an end surface of the second rotor close to the first rotor.

14. The compressor according to claim 13, wherein an end surface of the first rotor close to the second rotor is provided with a first limiting groove along the axial direction of the first rotating shaft, the first limiting member comprises a first main body portion and a first limiting portion, the first main body portion is sleeved on the first rotor, the first limiting portion is disposed around the periphery of the outer surface of the first main body portion and the first limiting portion is stuck in the first limiting groove; and an end surface of the second rotor close to the first rotor is provided with a second limiting groove along the axial direction of the first rotating shaft, the second limiting member comprises a second main body portion and a second limiting portion, the second main body portion is sleeved on the first rotating shaft and disposed adjacent to the first main body portion, the second limiting portion is disposed around the periphery of the outer surface of the second main body portion and the second limiting portion is stuck in the second limiting groove.

15. The compressor according to claim 14, wherein an end surface of the first limiting portion close to the second limiting portion protrudes on a side of the end surface of the first rotor close to the second rotor, and an end surface of the second limiting portion close to the first limiting portion protrudes on a side of the end surface of the second rotor close to the first rotor.

16. The compressor according to claim 13, wherein the first limiting member comprises a first main body portion and a first limiting portion, the first main body portion is sleeved on the first rotating shaft-(29), the first limiting portion is disposed around the periphery of the outer surface of the first main body portion, and a side of the first limiting portion away from the second rotor abuts against an end surface of the first rotor close to the second rotor; and the second limiting member comprises a second main body portion and a second limiting portion, the second main body portion is sleeved on the first rotating shaft and disposed adjacent to the first main body portion, the second limiting portion is disposed around the periphery of the outer surface of the second main body portion, and a side of the second limiting portion away from the first rotor abuts against an end surface of the second rotor close to the first rotor.

17. The compressor according to claim 13, wherein the connecting assembly further comprises a third limiting member and a fourth limiting member, the third limiting member is configured to limit the distance between an end surface of the first rotor away from the second rotor and the housing, and the fourth limiting member is configured to limit the distance between an end surface of the second rotor away from the first rotor and the housing.

18. The compressor according to claim 17, wherein the third limiting member comprises a third main body portion and a third limiting portion, the third main body portion is sleeved on the first rotating shaft and disposed adjacent to the first main body portion, the third limiting portion is disposed around the periphery of the outer surface of the third main body portion, and the third limiting portion abuts against the end surface of the first rotor away from the second rotor; and the fourth limiting member comprises a fourth main body portion and a fourth limiting portion, the fourth main body portion is sleeved on the first rotating shaft and disposed adjacent to the second main body portion, the fourth limiting portion is disposed around the periphery of the outer surface of the fourth main body portion, and the fourth limiting portion abuts against an end surface of the second rotor away from the first rotor.

19. The compressor according to claim 17, wherein the end surface of the first rotor away from the second rotor is provided with a third limiting groove along the axial direction of the first rotating shaft, the third limiting member comprises a third main body portion and a third limiting portion, the third main body portion is sleeved on the first rotating shaft and disposed adjacent to the first main body portion, the third limiting portion is disposed around the periphery of the outer surface of the third main body portion and the third limiting portion is stuck in the third limiting groove; and an end surface of the second rotor away from the first rotor is provided with a fourth limiting groove along the axial direction of the first rotating shaft, the fourth limiting member comprises a fourth main body portion and a fourth limiting portion, the fourth main body portion is sleeved on the first rotating shaft and disposed adjacent to the second main body portion, the fourth limiting portion is disposed around the periphery of the outer surface of the fourth main body portion and the fourth limiting portion is stuck in the fourth limiting groove.

20. The compressor according to claim 1, wherein the material of the connecting assembly comprises a tin bronze material.

21. The compressor according to claim 1, wherein the first rotating shaft and the connecting assembly are each provided with an oil supply passage, and the oil supply passages located on the first rotating shaft are in communication with the oil supply passage located on the connecting assembly.

22. An air conditioner, comprising the compressor according to claim 1.

* * * * *